(12) United States Patent
Mazumdar (10) Patent No.: US 10,286,787 B2
(45) Date of Patent: May 14, 2019

(54) SYSTEM AND METHOD FOR ALL ELECTRICAL OPERATION OF A MINING HAUL TRUCK

(71) Applicant: Joy Mazumdar, Norcross, GA (US)

(72) Inventor: Joy Mazumdar, Norcross, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 25 days.

(21) Appl. No.: 14/038,995

(22) Filed: Sep. 27, 2013

(65) Prior Publication Data
US 2015/0090554 A1 Apr. 2, 2015

(51) Int. Cl.
| | |
|---|---|
| *H02P 27/04* | (2016.01) |
| *B60L 11/18* | (2006.01) |
| *B60L 5/00* | (2006.01) |
| *B60L 9/00* | (2019.01) |
| *H02P 3/14* | (2006.01) |

(Continued)

(52) U.S. Cl.
CPC .............. *B60L 11/1801* (2013.01); *B60L 5/00* (2013.01); *B60L 9/00* (2013.01); *B60L 50/40* (2019.02); *B60L 50/53* (2019.02); *H02P 3/14* (2013.01); *B60L 2200/40* (2013.01); *Y02T 10/646* (2013.01); *Y02T 10/7005* (2013.01)

(58) Field of Classification Search
CPC ...... H02P 21/06; H02P 23/08; H02P 2207/01; H02P 21/085; H02M 5/271
See application file for complete search history.

(56) References Cited

U.S. PATENT DOCUMENTS

| | | |
|---|---|---|
| 3,847,089 A | 11/1974 | Nelson |
| 4,358,719 A | 11/1982 | Currier et al. |
| 5,124,510 A | 6/1992 | Garfinkle |

(Continued)

FOREIGN PATENT DOCUMENTS

| | | |
|---|---|---|
| CA | 2925605 A1 | 4/2015 |
| DE | 3235107 A1 | 4/1983 |

(Continued)

OTHER PUBLICATIONS

PCT International Search Report dated Jan. 20, 2012 corresponding to PCT International Application No. PCT/US2010/045006 filed Aug. 10, 2010 (10 pages).

(Continued)

*Primary Examiner* — Bickey Dhakal
*Assistant Examiner* — Zoheb Imtiaz (57) ABSTRACT

A mining haul truck driven by electrical wheel motors is operated with all electrical power sources; that is, without a diesel engine. While travelling on the loading site, the mining haul truck is powered by an on-board energy storage system, which can comprise a bank of ultracapacitors. The mining haul truck then moves to the bottom of a trolley ramp and is coupled to trolley lines. While travelling uphill, the mining haul truck is powered by the trolley lines, and the on-board energy storage system is charged by the trolley lines. When the mining haul truck reaches the top of the trolley ramp, the mining haul truck is uncoupled from the trolley lines. While travelling on the unloading site, the mining haul truck is powered by the on-board energy storage system. The on-board energy storage system can also be charged by retard energy generated by the wheel motors during braking.

17 Claims, 11 Drawing Sheets

(51) Int. Cl.
*B60L 50/53* (2019.01)
*B60L 50/40* (2019.01)

(56) References Cited

U.S. PATENT DOCUMENTS

| | | | |
|---|---|---|---|
| 5,293,947 A | 3/1994 | Stratton | |
| 5,351,775 A | 10/1994 | Johnston et al. | |
| 5,582,262 A | 12/1996 | Wust | |
| 5,886,619 A | 3/1999 | Takasan et al. | |
| 6,268,673 B1 | 7/2001 | Shah et al. | |
| 6,396,178 B1 | 5/2002 | Chiu | |
| 6,612,245 B2 | 9/2003 | Kumar et al. | |
| 6,619,212 B1 | 9/2003 | Stephan et al. | |
| 6,646,360 B2 | 11/2003 | Brown | |
| 6,651,566 B2 | 11/2003 | Stephan et al. | |
| 6,742,630 B2 | 6/2004 | Eilinger | |
| 7,137,344 B2 | 11/2006 | Kumar et al. | |
| 7,430,967 B2 | 10/2008 | Kumar | |
| 7,459,888 B2 | 12/2008 | Schulte et al. | |
| 7,565,867 B2 | 7/2009 | Donnelly et al. | |
| 7,571,683 B2 * | 8/2009 | Kumar | B60L 9/16 105/35 |
| 7,812,555 B2 | 10/2010 | Adra | |
| 8,054,016 B2 | 11/2011 | Gottemoller et al. | |
| 8,069,792 B2 | 12/2011 | Shapery | |
| 8,140,206 B2 | 3/2012 | Bailey et al. | |
| 2002/0014383 A1 | 2/2002 | Brooks | |
| 2003/0151387 A1 | 8/2003 | Kumar | |
| 2003/0173172 A1 | 9/2003 | Stephan et al. | |
| 2005/0005814 A1 | 1/2005 | Kumar et al. | |
| 2005/0168181 A1 * | 8/2005 | Okumura | H02P 6/17 318/268 |
| 2005/0178632 A1 | 8/2005 | Ross | |
| 2005/0235865 A1 * | 10/2005 | Kumar | B60L 9/16 105/61 |
| 2006/0061307 A1 | 3/2006 | Donnelly | |
| 2008/0136359 A1 * | 6/2008 | Chung | B60K 6/32 318/377 |
| 2008/0143288 A1 * | 6/2008 | Iwaji | G11B 19/28 318/722 |
| 2009/0032350 A1 * | 2/2009 | Shapery | B60L 5/005 191/10 |
| 2009/0039809 A1 | 2/2009 | Takeuchi | |
| 2009/0127048 A1 | 5/2009 | Ichimura | |
| 2010/0063646 A1 | 3/2010 | Ibaiondo Madariaga et al. | |
| 2010/0090629 A1 * | 4/2010 | Tang | B60L 15/025 318/400.09 |
| 2010/0282557 A1 | 11/2010 | He et al. | |
| 2010/0289443 A1 | 11/2010 | Mazumdar et al. | |
| 2010/0300780 A1 | 12/2010 | Caruso et al. | |
| 2011/0011658 A1 * | 1/2011 | Takizawa | B60L 3/0092 180/65.31 |
| 2011/0094808 A1 | 4/2011 | Mazumdar et al. | |
| 2011/0094841 A1 | 4/2011 | Mazumdar et al. | |
| 2011/0175579 A1 | 7/2011 | Mazumdar | |
| 2011/0301794 A1 | 12/2011 | Bastien | |
| 2012/0038318 A1 * | 2/2012 | Mueller | B60L 7/16 320/109 |
| 2012/0085612 A1 | 4/2012 | Churchill | |
| 2013/0126251 A1 | 5/2013 | Ruth | |
| 2013/0140121 A1 * | 6/2013 | Huber | B60L 5/04 191/59.1 |
| 2013/0158827 A1 * | 6/2013 | Lammers | B60L 15/2009 701/70 |
| 2015/0090554 A1 | 4/2015 | Mazumdar | |
| 2015/0145445 A1 * | 5/2015 | Kim | H02P 29/68 318/400.02 |

FOREIGN PATENT DOCUMENTS

| | | |
|---|---|---|
| DE | 4239164 C1 | 4/1994 |
| DE | 19823233 A1 | 12/1999 |
| EP | 1126085 A1 | 8/2001 |
| EP | 1350666 A1 | 10/2003 |
| EP | 1452710 A1 | 9/2004 |
| EP | 1571352 A1 | 9/2005 |
| EP | 1939030 A1 | 7/2008 |
| EP | 1985490 A1 | 10/2008 |
| JP | 58152629 A | 9/1983 |
| JP | 2002305803 A | 10/2002 |
| JP | 2004304989 A | 10/2004 |
| WO | 2010023033 A1 | 3/2010 |
| WO | 2015048422 A1 | 4/2015 |
| ZA | 993472 A | 11/1999 |

OTHER PUBLICATIONS

U.S. Appl. No. 12/466,722, filed May 15, 2009 (unpublished).

* cited by examiner

PRIOR ART

FIG. 1

PRIOR ART

SYSTEM AND METHOD FOR ALL ELECTRICAL OPERATION OF A MINING HAUL TRUCK

BACKGROUND OF THE INVENTION

The present invention relates generally to power systems for mining haul trucks, and more particularly to a system and method for all electrical operation of a mining haul truck.

Mining haul trucks are typically equipped with electrical drive motors. Under demanding conditions, such as travel on an uphill grade, electrical power can be supplied by a trolley line. The mining haul truck draws electrical power from the trolley line via a pantograph. Under some travel conditions, such as inside a mining pit, around a crusher, and on level surfaces, however, the mining haul truck operates independently of a trolley line. Electrical power is then supplied by an electrical generator powered by a diesel engine. Diesel engines require delivery and storage of a supply of fuel and require regular maintenance. The exhaust gases from diesel engines, furthermore, contribute to air pollution.

BRIEF SUMMARY OF THE INVENTION

In an embodiment of the invention, a mining haul truck driven by electrical motors is operated from all electrical power sources, without the need for a diesel engine driving a generator. When the mining haul truck is travelling on substantially flat ground, electrical power is supplied by an on-board energy storage system. When the mining haul truck is travelling along an uphill grade, electrical power is supplied by trolley lines. The on-board energy storage system is also charged with electrical power from the trolley lines. In an embodiment of the invention, the on-board energy storage system is charged with retard energy captured from the electrical motors during braking.

These and other advantages of the invention will be apparent to those of ordinary skill in the art by reference to the following detailed description and the accompanying drawings.

DETAILED DESCRIPTION

Figure 1:
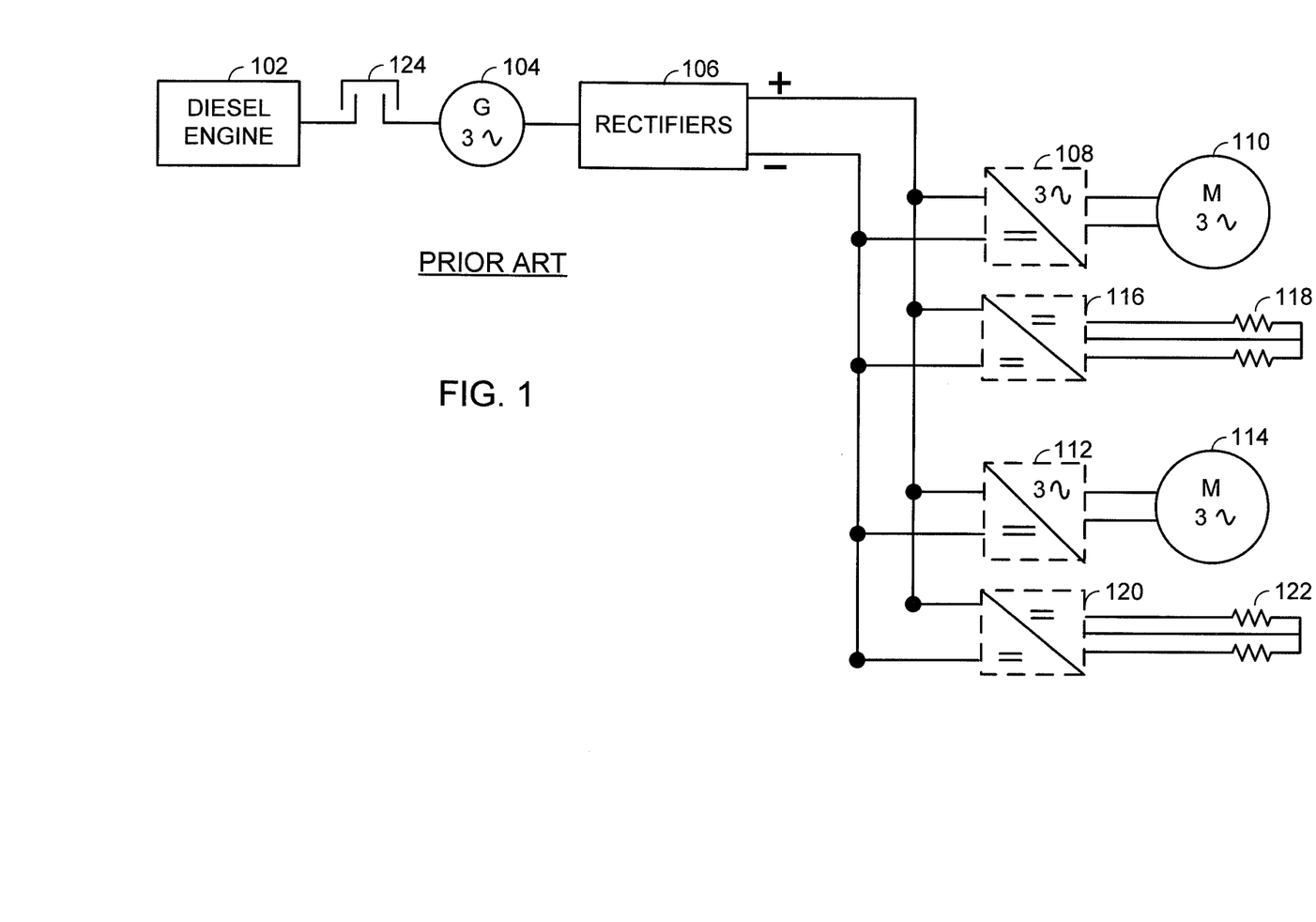
FIG. 1 shows a single-line diagram of a prior-art diesel-powered electrical system for a mining haul truck.

FIG. 1 shows a single-line diagram of a prior-art mining haul truck power system. The mining haul truck has two drive wheels. Each wheel is driven by a 3-phase alternating-current (AC) wheel motor (M). The wheel motors are referenced as the wheel motor 110 and the wheel motor 114. Electrical power is supplied by a diesel engine 102 driving a 3-phase AC generator (G) 104. (Other types of mechanical engines may be used; diesel engines are typical in mining operations.) The coupling 124 couples the diesel engine 102 to the generator 104. The diesel engine 102 and the generator 104 are mounted on the mining haul truck. The AC output of the generator 104 is fed into the rectifiers 106. The direct current (DC) output of the rectifiers 106 is fed into a set of inverters. The inverters 108 supply 3-phase AC power to the wheel motor 110. Similarly, the inverters 112 supply 3-phase AC power to the wheel motor 114. The chopper 116 and the power resistor grid 118 dissipate energy from the wheel motor 110 during braking action. Similarly, the chopper 120 and the power resistor grid 122 dissipate energy from the wheel motor 114 during braking action. Braking action is described in more detail below.

In the power system shown in FIG. 1, the entire power requirements for the wheel motor 110 and the wheel motor 114 are supplied by the diesel engine 102. Performance (as determined, for example, by acceleration and speed) of the mining haul truck is limited by the power capacity of the diesel engine. In particular, when the mining haul truck, filled with a heavy payload, is travelling along an uphill grade, the diesel engine may be stressed to maximum capacity. One method for reducing the power demand on the diesel engine as the mining haul truck travels on an uphill grade is to power the wheel motors entirely via electrical power drawn from a trolley line. During this operational mode, the generator 104 is disconnected from the diesel engine 102 via the coupling 124. The diesel engine then idles on uphill grades. As a result, fuel consumption is reduced by ~95%; noise and exhaust emissions are reduced; and productivity and engine life are increased.

Figure 2:
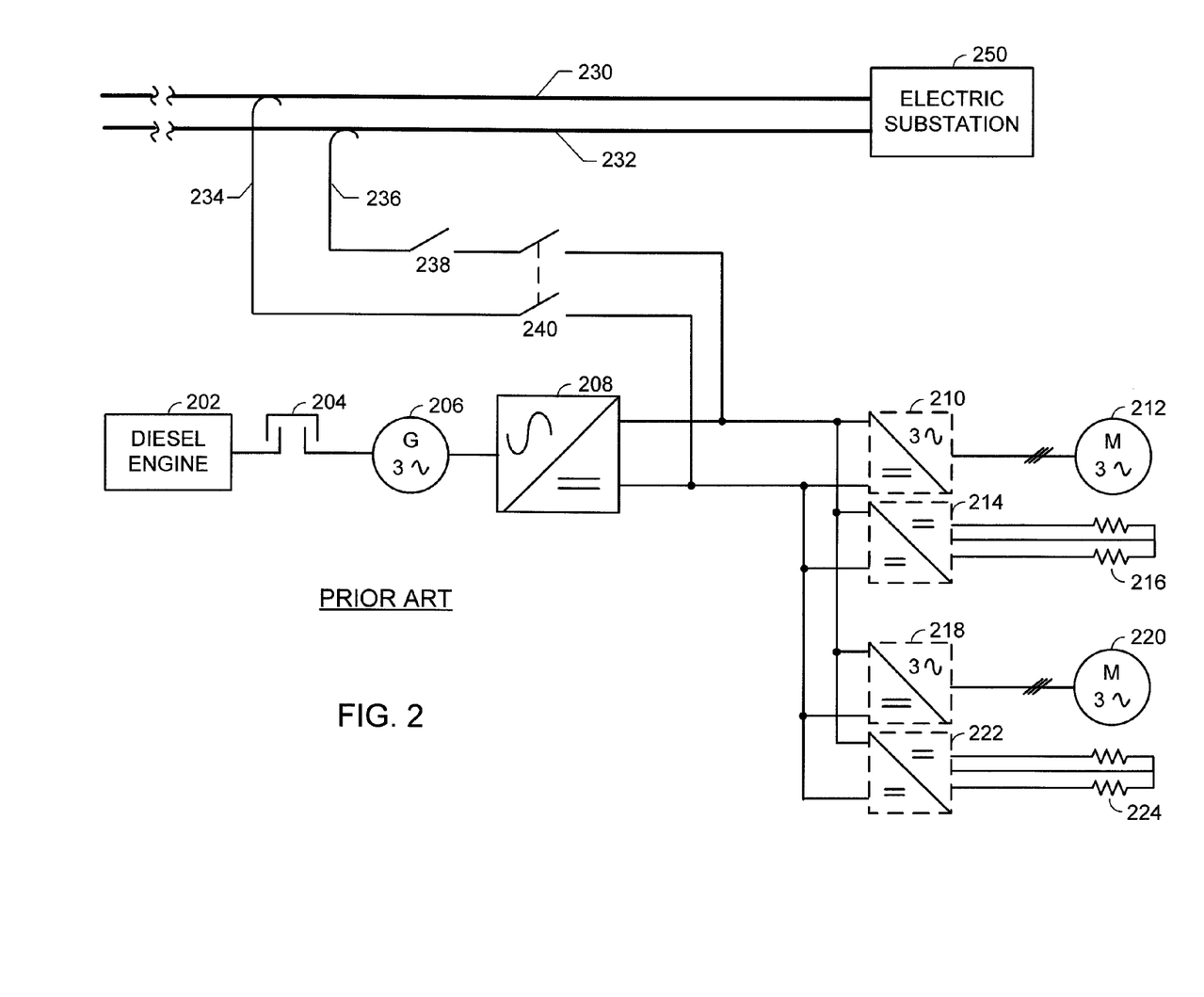
FIG. 2 shows a single-line diagram of a prior-art trolley power system for a mining haul truck.

FIG. 2 shows a single-line diagram of a prior-art mining haul truck power system including an overhead trolley power system. Similar to the power system shown in FIG. 1, the diesel engine 202 is connected via the coupling 204 to the 3-phase AC generator 206. The AC output of the generator 206 is fed into the rectifiers 208. The DC output of the rectifiers 208 is fed into the inverters 210, which provide power to the wheel motor 212, and into the inverters 218, which provide power to the wheel motor 220.

The inputs of the inverters 210 and the inverters 218 can also be connected to DC power supplied by the electric substation 250 via the trolley line 230 and the trolley line 232. A trolley line is also referred to as an overhead line. Electrical connection of the mining haul truck to the trolley line 230 and the trolley line 232 is implemented via the pantograph arm 234 and the pantograph arm 236, respectively. The throw switch 240 connects/disconnects the inputs of the inverters 210 and the inverters 218 to the trolley line 230 and the trolley line 232. There is also an auxiliary breaker 238. As mentioned above, when the mining haul truck is powered by the trolley power system, the diesel engine 202 is typically disconnected from the generator 206 via the coupling 204.

Figure 3:
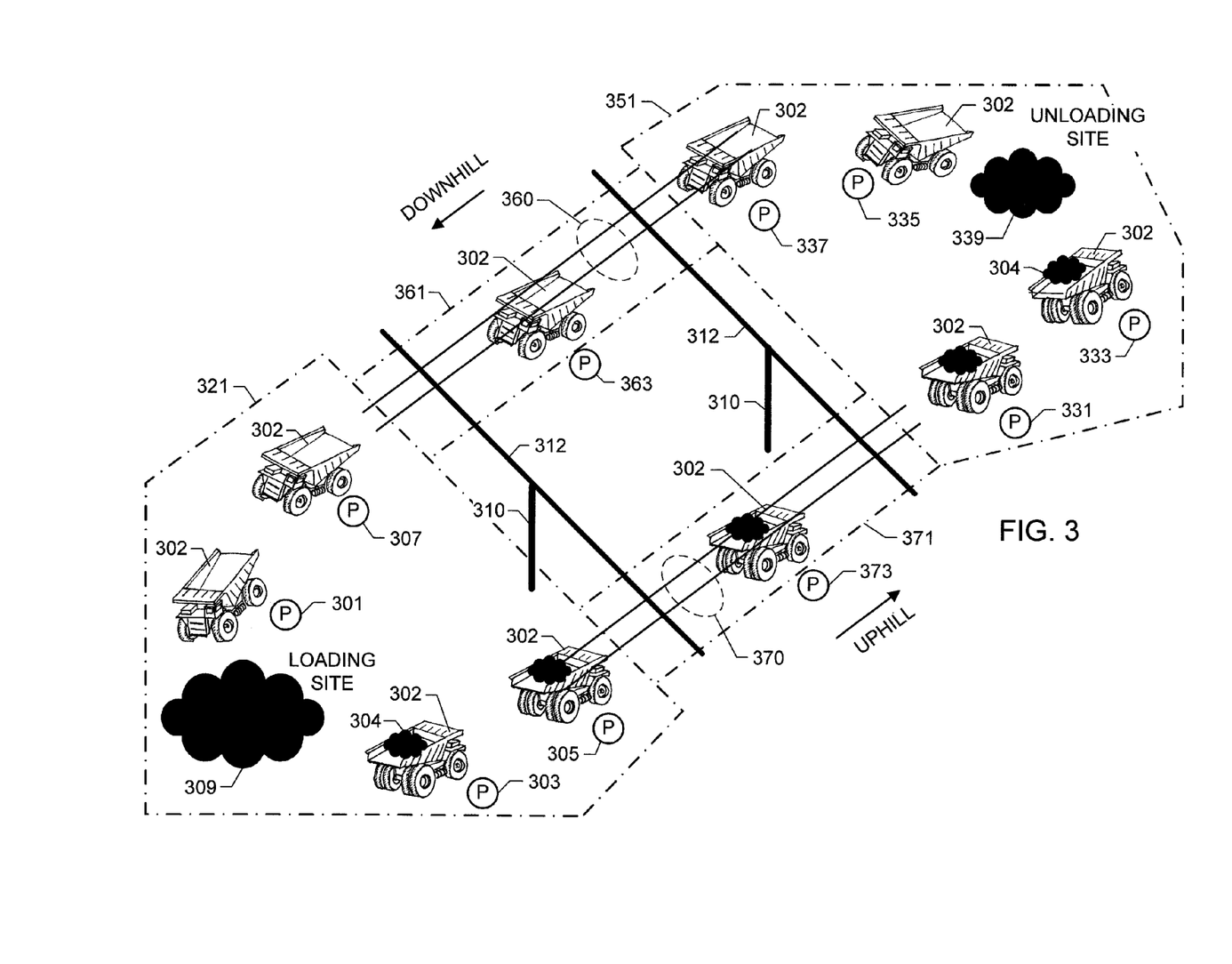
FIG. 3 shows a schematic of a first travel scenario for a mining haul truck.

FIG. 3 shows a mining site in which the loading site is downhill from the unloading site; for example, the loading site is at the bottom of a pit, and the payload is trucked out of the pit. The loading site 309 is located within the region 321. Within the region 321, the mining haul truck 302 is not powered by trolley lines. The unloading site 339 is located within the region 351. Within the region 351, the mining haul truck 302 is not powered by trolley lines. Typically, the terrain within the region 321 and within the region 351 is substantially flat.

In the uphill direction, the region 321 and the region 351 are connected by the trolley ramp 371, along which electrical power is available from the trolley lines 370 (for simplicity, the trolley lines 370 refer to a pair of trolley lines). In the downhill direction, the region 351 and the region 321 are connected by the trolley ramp 361, along which electrical power is available from the trolley lines 360. The trolley lines 370 and the trolley lines 360 are supported overhead by the support arms 312 mounted on the support poles 310.

In an embodiment of the invention, the mining haul truck is equipped with an on-board energy storage system (OBESS) that provides electrical power when the mining haul truck is operating within region 321 or within region 351. A diesel engine and generator are not needed. An OBESS refers to an energy storage system that travels with the mining haul truck (for example, mounted on the mining haul truck or attached to the mining haul truck or mounted on a trailer attached to the mining haul truck). In an embodiment of the invention, an OBESS includes a bank of ultracapacitors, a bank of batteries, or a bank of ultracapacitors and a bank of batteries. Further details of an OBESS are provided below. All electrical operation of the mining haul truck is first described.

Refer to travel scenario shown in FIG. 3. Powered by the OBESS, the mining haul truck 302 starts in region 321 at position P 301 and moves to the loading site 309. At the loading site 309, an electric shovel (not shown) fills the payload 304 (such as ore) onto the mining haul truck 302, which then leaves the loading site 309 at position P 303. The mining haul truck 302 then moves to position P 305, the entrance to the trolley ramp 371. The mining haul truck 302 is coupled to the trolley lines 370. Under trolley power (trolley power refers to electrical power drawn from the trolley lines), the mining haul truck 302 moves up the trolley ramp 371 (shown as position P 373) and arrives at position P 331. While the mining haul truck 302 is coupled to the trolley lines 370, trolley power is used to recharge the OBESS.

Position P 331 is the exit for the trolley ramp 371. The mining haul truck 302 is then uncoupled from the trolley lines 370. Powered by the OBESS, the mining haul truck 302 travels to position P 333 and then to the unloading site 339, where the mining haul truck 302 unloads the payload 304. The mining haul truck then departs the unloading site 339 at position P 335 and moves to position P 337, the entrance to the trolley ramp 361. The mining haul truck 302 is coupled to the trolley lines 360. Under trolley power, the mining haul truck 302 moves down the trolley ramp 361 (shown as position P 363) and arrives at position P 307. While the mining haul truck 302 is coupled to the trolley lines 360, trolley power is used to recharge the OBESS.

Position 307 is the exit for the trolley ramp 361. The mining haul truck 302 is then uncoupled from the trolley lines 360. Powered by the OBESS, the mining haul truck 302 moves to the position P 301 to start another work cycle.

Figure 4:
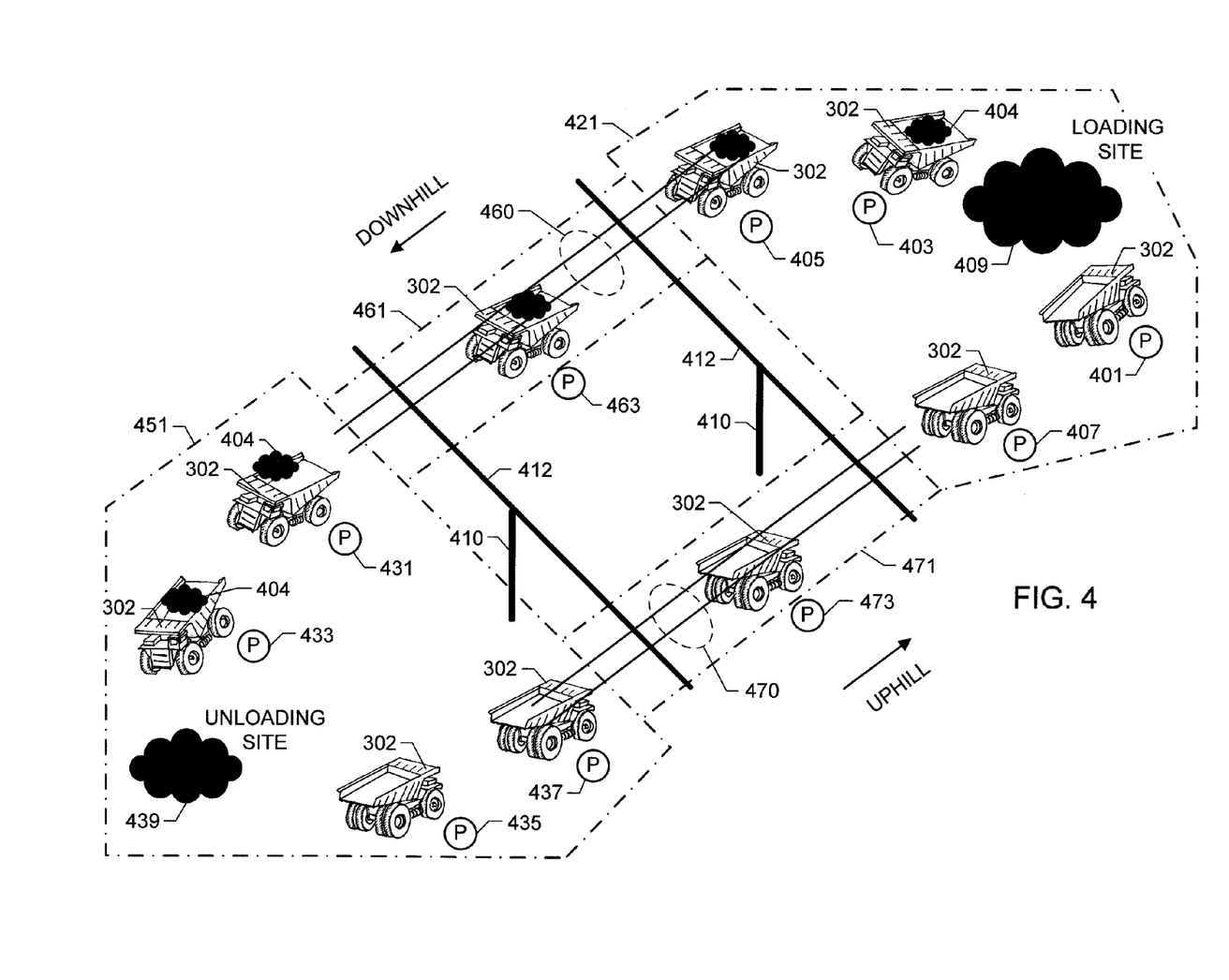
FIG. 4 shows a schematic of a second travel scenario for a mining haul truck.

Refer to travel scenario shown in FIG. 4, which shows a mining site in which the loading site is uphill from the unloading site. The loading site 409 is located within the region 421. Within the region 421, the mining haul truck 302 is not powered by trolley lines. The unloading site 439 is located within the region 451. Within the region 451, the mining haul truck 302 is not powered by trolley lines. Typically, the terrain within the region 421 and within the region 451 is substantially flat.

In the uphill direction, the region 451 and the region 421 are connected by the trolley ramp 471, along which trolley power is available from the trolley lines 470. In the downhill direction, the region 421 and the region 451 are connected by the trolley ramp 461, along which trolley power is available from the trolley lines 460. The trolley lines 470 and the trolley lines 460 are supported overhead by the support arms 412 mounted on the support poles 410.

Powered by an OBESS, the mining haul truck 302 starts in region 421 at position P 401 and moves to the loading site 409. At the loading site 409, an electric shovel (not shown) fills the payload 404 (such as ore) onto the mining haul truck 302, which then leaves the loading site 409 at position P 403. The mining haul truck 302 then moves to position P 405, the entrance to the trolley ramp 461. The mining haul truck 302 is coupled to the trolley lines 460. Under trolley power, the mining haul truck 302 moves down the trolley ramp 461 (shown as position P 463) and arrives at position P 431. While the mining haul truck 302 is coupled to the trolley lines 460, trolley power is used to recharge the OBESS.

Position P 431 is the exit for the trolley ramp 461. The mining haul truck 302 is then uncoupled from the trolley lines 460. Powered by the OBESS, the mining haul truck 302 travels to position P 433 and then to the unloading site 439, where the mining haul truck 302 unloads the payload 404. The mining haul truck 302 then departs the unloading site 439 at position P 435 and moves to position P 437, the entrance to the trolley ramp 471. The mining haul truck 302 is coupled to the trolley lines 470. Under trolley power, the mining haul truck 302 moves up the trolley ramp 471 (shown as position P 473) and arrives at position P 407. While the mining haul truck 302 is coupled to the trolley lines 470, trolley power is used to recharge the OBESS.

Position P 407 is the exit for the trolley ramp 471. The mining haul truck 302 is then uncoupled from the trolley lines 470. Powered by the OBESS, the mining haul truck 302 moves to the position P 401 to start another work cycle.

Figure 5A:
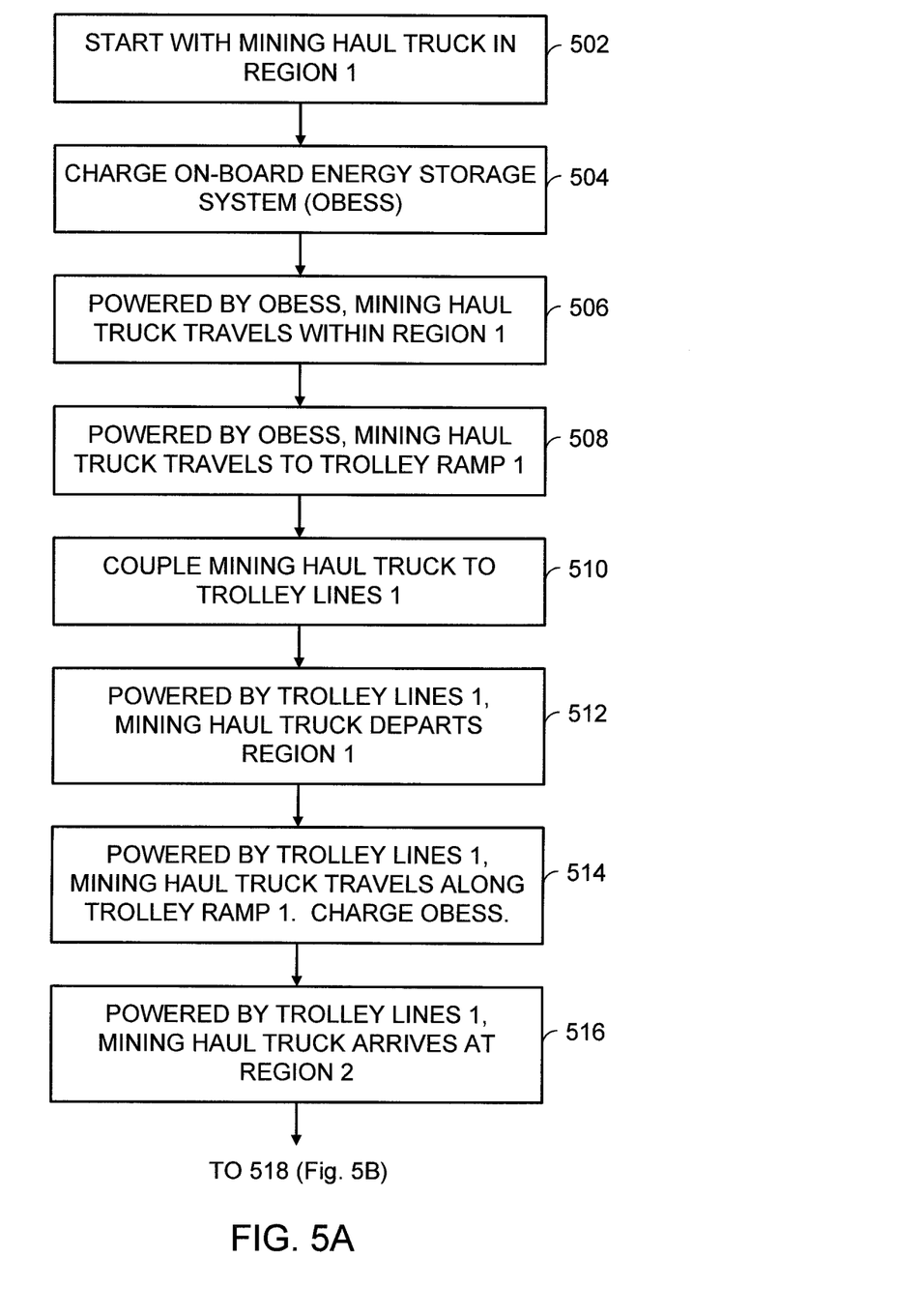
FIG. 5A and FIG. 5B show a flowchart of a process for all electrical operation of a mining haul truck.
Figure 5B:
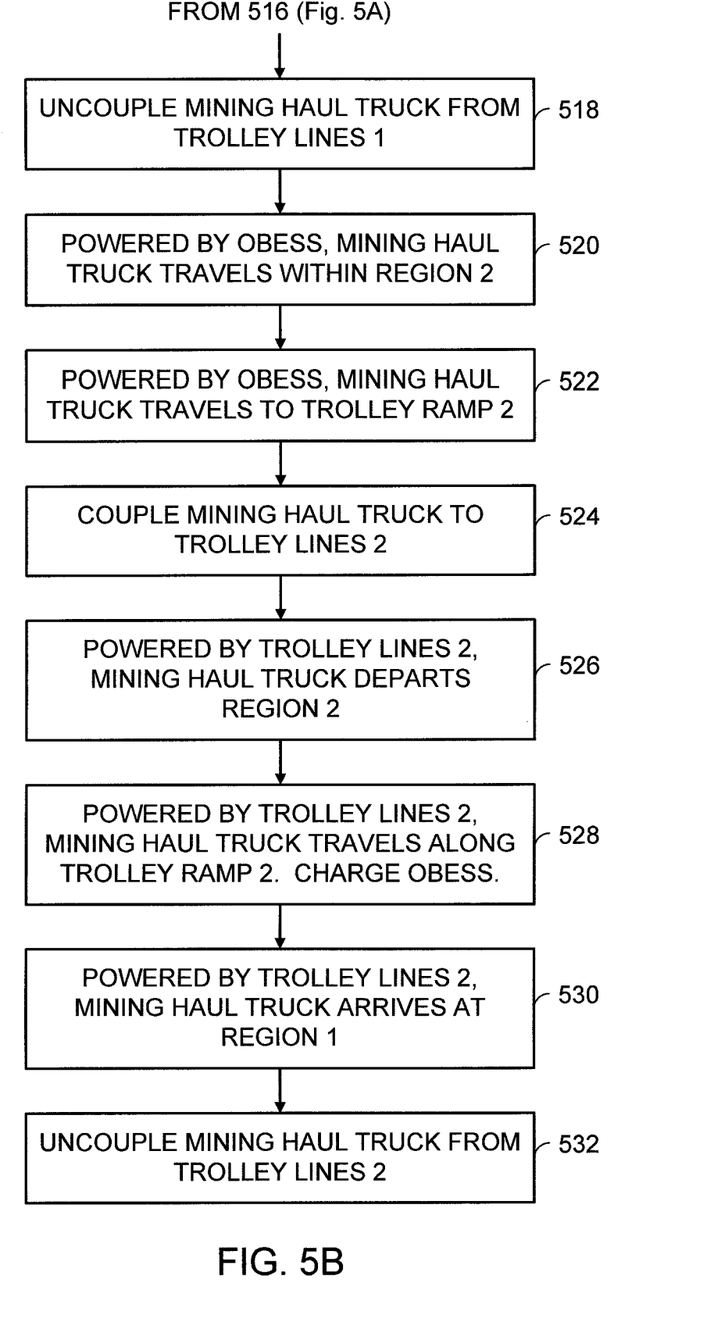

A method for all electrical operation of a mining haul truck is summarized in the flowchart of FIG. 5A and FIG. 5B. In step 502, the mining haul truck starts in region 1. In step 504, the on-board energy storage system (OBESS) is initially charged from an available electrical power source (such as a charging station, trolley lines, or diesel engine and generator). In step 506, powered by the OBESS, the mining haul truck travels within the region 1 (for example, travels to a loading site and receives a payload). In step 508, powered by the OBESS, the mining haul truck travels to the trolley ramp 1.

In step 510, the mining haul truck is coupled to the trolley lines 1. In step 512, powered by the trolley lines 1, the mining haul truck departs region 1. In step 514, powered by the trolley lines 1, the mining haul truck travels along the trolley ramp 1. The OBESS is charged by electrical power from the trolley lines 1. In step 516, powered by the trolley lines 1, the mining haul truck arrives at region 2.

In step 518, the mining haul truck is uncoupled from the trolley lines 1. In step 520, powered by the OBESS, the mining haul truck travels within the region 2 (for example, travels to an unloading site and dumps the payload). In step 522, powered by the OBESS, the mining haul truck travels to the trolley ramp 2.

In step 524, the mining haul truck is coupled to the trolley lines 2. In step 526, powered by the trolley lines 2, the mining haul truck departs region 2. In step 528, powered by the trolley lines 2, the mining haul truck travels along the trolley ramp 2. The OBESS is charged by electrical power from the trolley lines 2. In step 530, powered by the trolley lines 2, the mining haul truck arrives at region 1. In step 532, the mining haul truck is uncoupled from the trolley lines 2. The mining haul truck has a charged OBESS and is ready to start another work cycle.

In an embodiment of the invention, the OBESS is charged with retard energy from the wheel motors. To slow down a moving mining haul truck, the mining haul truck drive system operates in a retard mode. Under normal operation, an electrical motor converts electrical energy into mechanical energy. The operating mode in which an electrical motor converts electrical energy into mechanical energy is referred to as the propel mode, and a time interval during which the electrical motor operates in a propel mode is referred to as a propel interval. An electrical motor can also be operated in reverse as a generator to convert mechanical energy into electrical energy (referred to as retard energy), which is fed into inverters. The operating mode in which the electrical motor converts mechanical energy into electrical energy is referred to as the retard mode, and a time interval during which the electrical motor operates in a retard mode is referred to as a retard interval.

Typically, braking choppers, connected to the inverters, channel the power into a power resistor grid that continuously dissipates the retard energy until the mining haul truck reaches standstill; that is, the retard energy is dissipated as waste heat. Braking is smooth, similar to the braking operation in a car, but without mechanical brake wear. Refer to the prior-art power system shown in FIG. 2, for example. The chopper 214 and the power resistor grid 216 provide the braking action for the wheel motor 212. Similarly, the chopper 222 and the power resistor grid 224 provide the braking action for the wheel motor 220.

In an embodiment of the invention, however, an OBESS is integrated into the mining haul truck power system to recover and store the retard energy. In particular, when a mining haul truck is travelling downhill, substantial quantities of retard energy can be captured and stored (especially if the mining haul truck is carrying a heavy payload), since the mining haul truck is frequently braking, and therefore there are frequent intervals during which the wheel motors are operating in the retard mode. Depending on the terrain, retard energy can also be captured during the uphill trip; retard energy can also be captured while the mining haul truck is travelling on level ground.

The retard energy is then used to charge the OBESS. In an embodiment of the invention, the OBESS is implemented with an ultracapacitor system comprising an ultracapacitor bank. The amount of energy that can be stored in the ultracapacitor system depends on the size of the ultracapacitor bank. The OBESS can also be implemented with a rechargeable battery system comprising a battery bank. The amount of energy that can be stored in the battery system depends on the size of the battery bank. The OBESS can also be implemented with combinations of ultracapacitor banks and battery banks. Storage capacity requirements are described below.

An ultracapacitor can provide high power densities. For increased electrical energy storage, multiple ultracapacitors can be connected in series and parallel to form an ultracapacitor bank. Electrical current flowing into an ultracapacitor charges the ultracapacitor, and electrical energy is stored via charge separation at an electrode-electrolyte interface. The stored electrical energy can then later be used to output an electrical current. To maximize the lifetime of an ultracapacitor, the ultracapacitor is not fully discharged. Typically, the ultracapacitor is discharged until its voltage drops to a minimum user-defined lower voltage limit. The lower voltage limit, for example, can be one-half of the initial fully-charged voltage.

Figure 6:
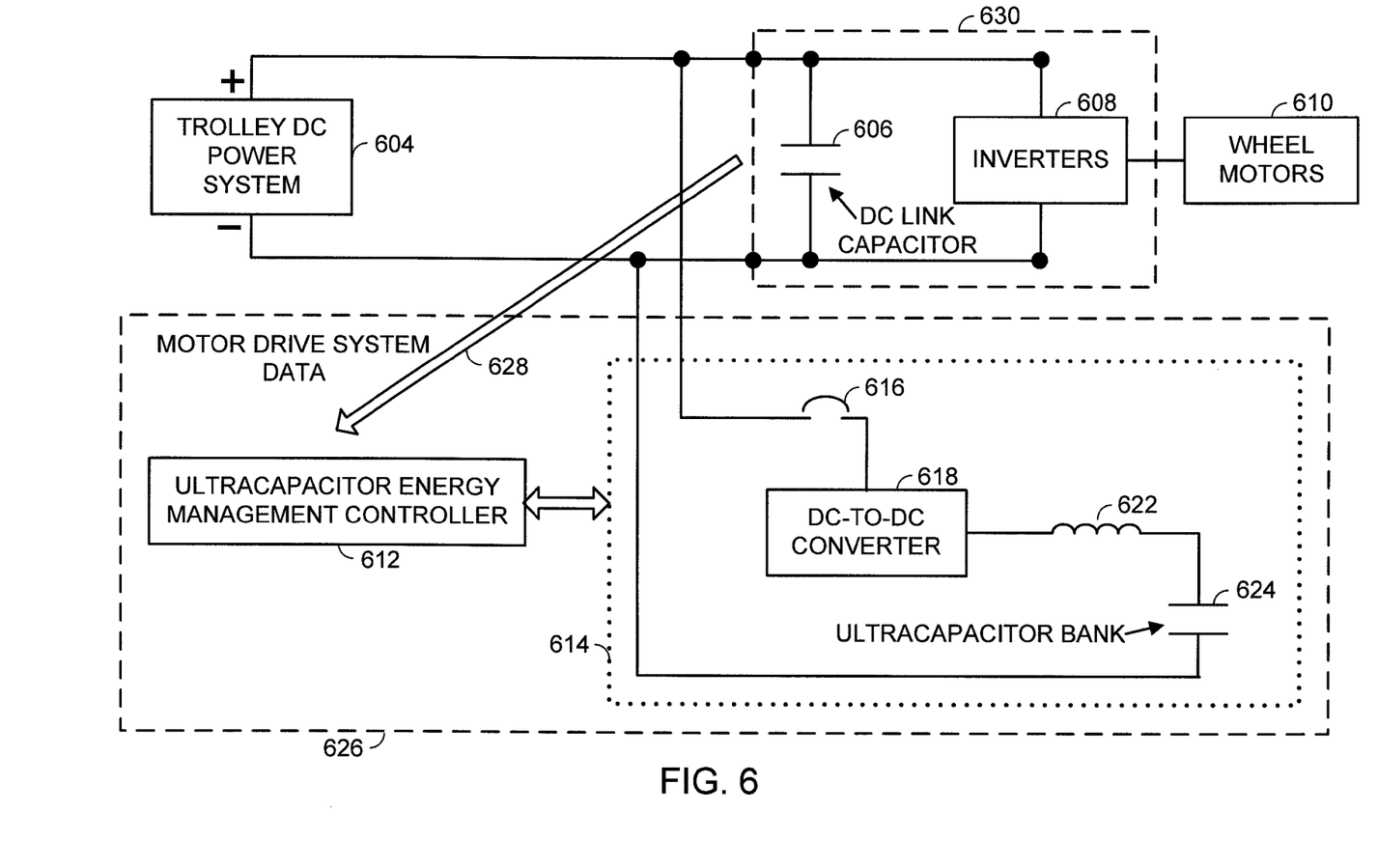
FIG. 6 shows a schematic of a power system with an ultracapacitor energy storage system.

FIG. 6 shows a schematic of an OBESS 626 integrated into a trolley power system. The wheel motors 610 are powered by the motor drive system 630, which includes the DC link capacitor 606 and the inverters 608. The trolley DC power system 604 provides DC power to the motor drive system 630 via trolley lines. In the example shown, the OBESS 626 includes the ultracapacitor electrical energy storage unit 614 and the ultracapacitor energy management controller 612. The ultracapacitor electrical energy storage unit 614 comprises the DC-to-DC converter 618, the choke/reactor 622, and the ultracapacitor bank 624. The ultracapacitor electrical energy storage unit 614 can be disconnected from the motor drive system 630 via the connect/disconnect switch 616.

The ultracapacitor electrical energy storage unit 614 is managed by the ultracapacitor energy management controller 612. The ultracapacitor energy management controller 612 can also receive motor drive system data 628, which characterizes operation of the motor drive system 630. The motor drive system data 628 includes, for example, DC link voltage, current, and temperature. In response to control signals or control commands from the ultracapacitor energy management controller 612, the ultracapacitor electrical energy storage unit 614 can (a) transmit electrical energy to the wheel motors, (b) receive electrical energy from the trolley DC power system, or (c) receive retard electrical energy from the wheel motors. If the ultracapacitor bank becomes fully charged, excess retard energy can be dissipated in the grid resistors. Excess retard energy can also be transmitted via the trolley lines and stored in an auxiliary energy storage system or transmitted via the trolley lines and returned to the utility grid via a bidirectional electric substation (as described in US Patent Application Publication No. 2011/0094841).

Figure 10:
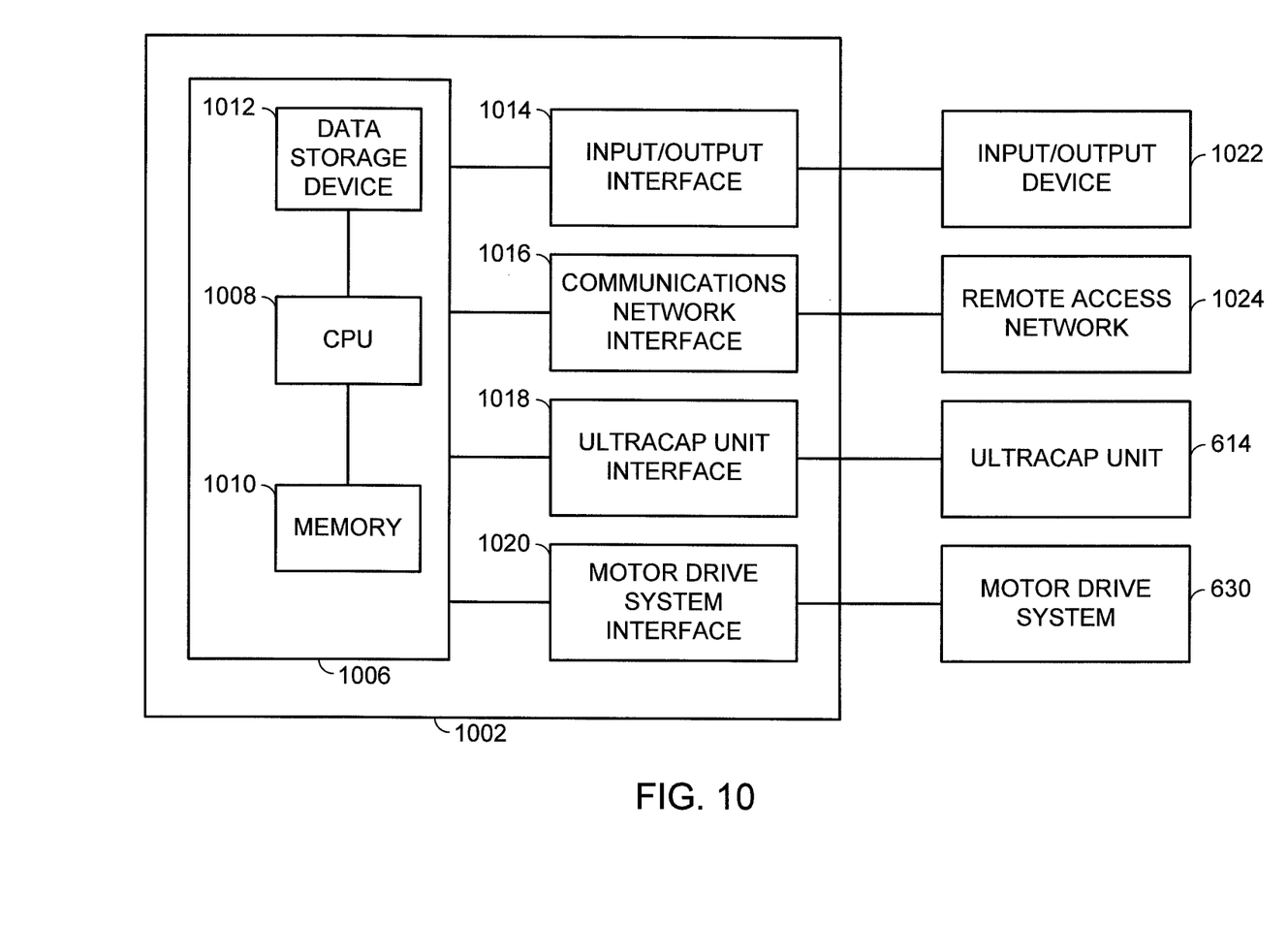
FIG. 10 shows a schematic of an ultracapacitor energy management controller.

An embodiment of a computational system for implementing the ultracapacitor energy management controller 612 (FIG. 6) is shown in FIG. 10. The computational system 1002 is typically located in the mining haul truck; however, other locations are possible. One skilled in the art can construct the computational system 1002 from various combinations of hardware, firmware, and software. One skilled in the art can construct the computational system 1002 from various electronic components, including one or more general purpose processors (such as microprocessors), one or more digital signal processors, one or more application-specific integrated circuits (ASICs), and one or more field-programmable gate arrays (FPGAs).

The computational system 1002 comprises the computer 1006, which includes a processor [referred to as the central processing unit (CPU) 1008], memory 1010, and a data storage device 1012. The data storage device 1012 comprises at least one persistent, tangible computer readable medium, such as non-volatile semiconductor memory, a magnetic hard drive, and a compact disc read only memory. In an embodiment of the invention, the computer 1006 is implemented as an integrated device.

The computational system 1002 can further comprise a user input/output interface 1014, which interfaces the computer 1006 to a user input/output device 1022. Examples of the input/output device 1022 include a keyboard, a mouse, and a local access terminal. Data, including computer executable code, can be transferred to and from the computer 1006 via the input/output interface 1014.

The computational system 1002 can further comprise a communications network interface 1016, which interfaces the computer 1006 with a remote access network 1024. Examples of the remote access network 1024 include a local area network and a wide area network (communications links can be wireless). A user can access the computer 1006 via a remote access terminal (not shown). Data, including computer executable code, can be transferred to and from the computer 1006 via the communications network interface 1016.

The computational system 1002 can further comprise the ultracapacitor electrical energy storage unit interface 1018, which interfaces the computer 1006 with the ultracapacitor electrical energy storage unit 614 (see FIG. 6). The computational system 1002 can further comprise a motor drive system interface 1020, which interfaces the computer 1006 with the motor drive system 630 (see FIG. 6). The motor drive system interface 1020, for example, receives the motor drive system data 628.

As is well known, a computer operates under control of computer software, which defines the overall operation of the computer and applications. The CPU 1008 controls the overall operation of the computer and applications by executing computer program instructions that define the overall operation and applications. The computer program instructions can be stored in the data storage device 1012 and loaded into memory 1010 when execution of the program instructions is desired.

The method steps shown in the flowchart in FIG. 5A and FIG. 5B can be defined by computer program instructions stored in the memory 1010 or in the data storage device 1012 (or in a combination of memory 1010 and the data storage device 1012) and controlled by the CPU 1008 executing the computer program instructions. For example, the computer program instructions can be implemented as computer executable code programmed by one skilled in the art to perform algorithms implementing the method steps shown in the flowchart in FIG. 5A and FIG. 5B. Accordingly, by executing the computer program instructions, the CPU 1008 executes algorithms implementing the method steps shown in the flowchart in FIG. 5A and FIG. 5B.

Required storage capacity of the OBESS can be estimated from calculations. For example, assume the following haul profile (travel scenario similar to that shown in FIG. 3):

500 m, flat: shovel (loading site) to trolley ramp, loaded
2000 m, 10% grade: trolley ramp, loaded
500 m, flat: trolley ramp to dump (unloading site), loaded
500 m, flat: dump to trolley ramp, empty
2000 m, −10% grade: trolley ramp, empty
500 m, flat: trolley ramp to shovel, empty.

Each leg of the profile specifies (a) the distance travelled, (b) slope of ground, (c) travel path, and (d) payload status of the mining haul truck. The weight of the empty mining haul truck is assumed to be 160,000 kg; and the weight of the loaded mining haul truck is assumed to be 400,000 kg.

Figure 7:
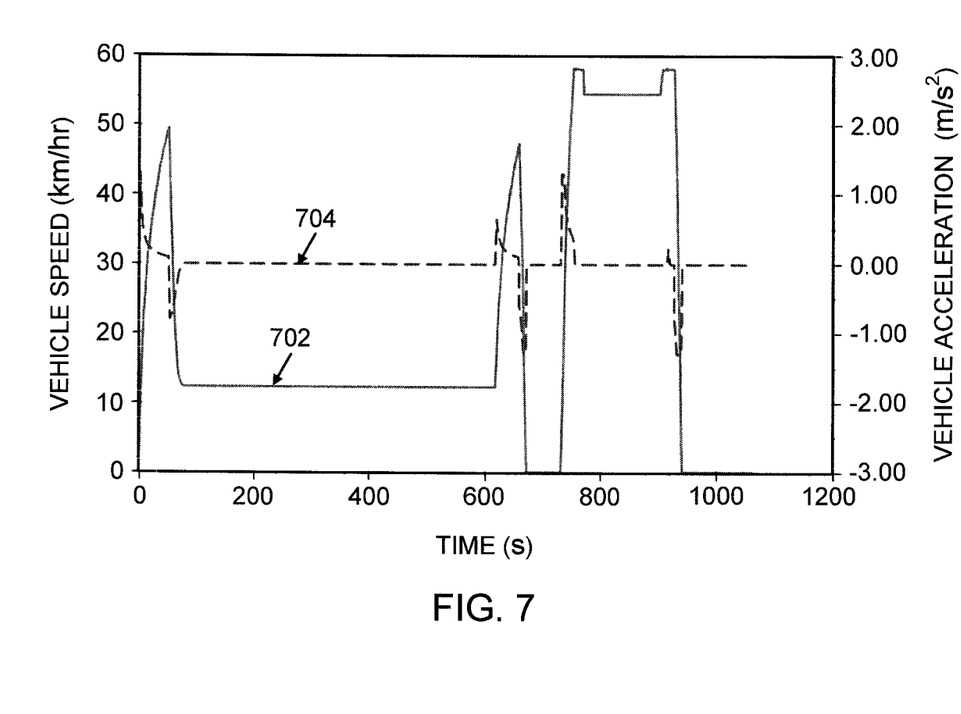
FIG. 7 shows a plot of vehicle speed as a function of travel time and a plot of vehicle acceleration as a function of travel time.
Figure 8:
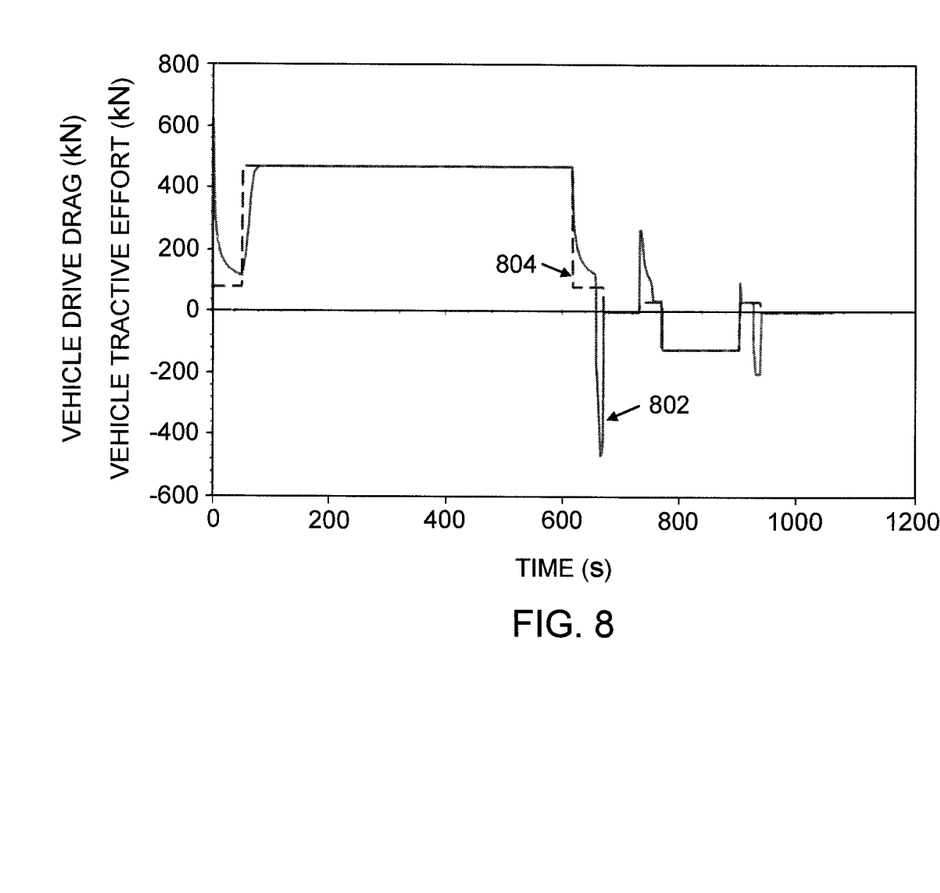
FIG. 8 shows a plot of vehicle tractive effort as a function of travel time and a plot of vehicle drive drag as a function of travel time.
Figure 9:
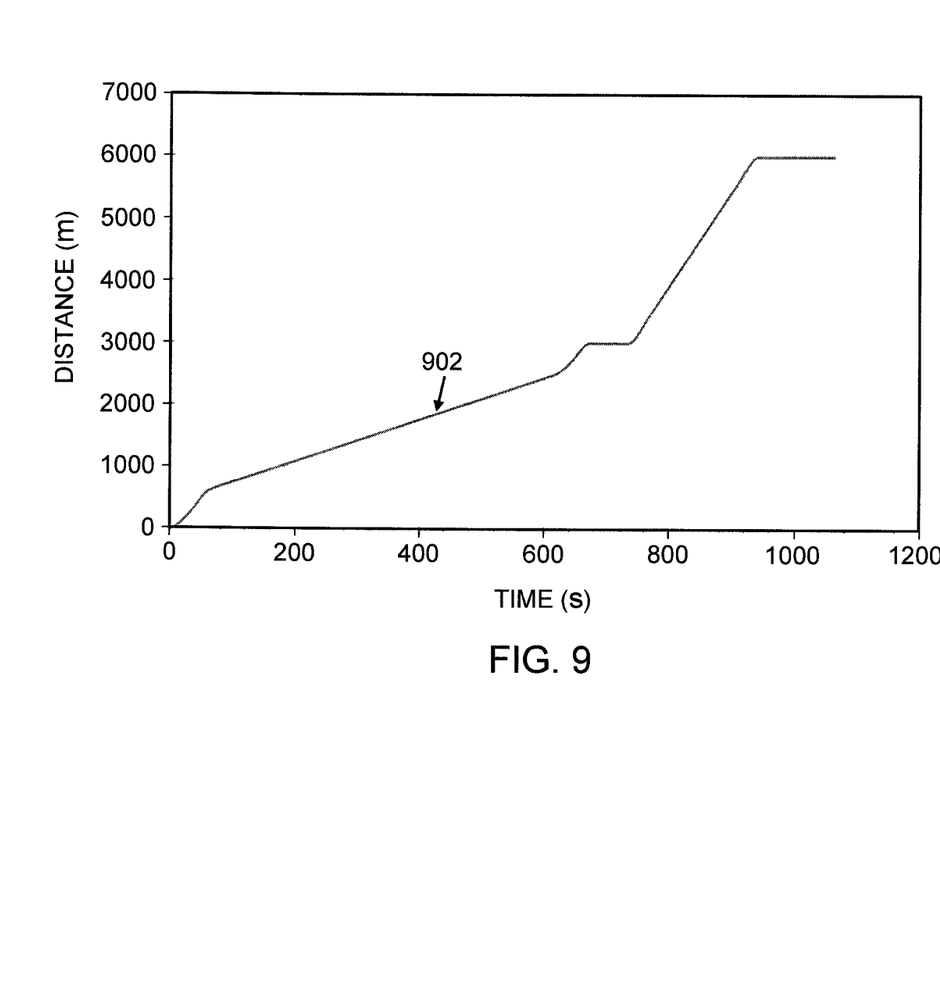
FIG. 9 shows a plot of travel distance as a function of travel time.

The speed and acceleration for the mining haul truck running on the above profile is shown in FIG. 7. Plot 702 shows the vehicle speed (km/hr) as a function of travel time (s). Plot 704 shows the vehicle acceleration (m/s$^2$) as a function of travel time (s). Refer to FIG. 8. Plot 802 shows the vehicle tractive effort (kN) as a function of travel time (s). Plot 804 shows the vehicle drive drag (kN) as a function of travel time (s). Refer to FIG. 9. Plot 902 shows the travel distance (m) as a function of travel time (s).

From FIG. 7, it can be seen that the mining haul truck needs about 50 s to reach the trolley ramp. Similarly, it would require about the same time to travel from the trolley ramp to the dump (unloading site). Returning from the dump to the trolley ramp would require less time since the mining haul truck is empty. The mining haul truck needs approximately 24 kWh of energy from the OBESS to move the mining haul truck from the shovel (loading site) to the trolley ramp. For all other areas, the energy required from the OBESS would be equal to or less than 24 kWh.

Selection of the appropriate energy storage device is important. Mines are often located in remote locations with extreme climatic conditions. Extreme cold conditions with temperatures below −20° C. pose particular challenges. In addition, mining haul trucks are subjected to extreme shocks and vibrations. Appropriate candidates for energy storage are traction grade ultracapacitors and traction grade batteries.

Refer back to the travel scenarios shown in FIG. 3 and in FIG. 4. Trolley power is supplied on both the uphill path and the downhill path. In some scenarios, trolley power is not needed on the downhill path if the OBESS is sufficiently charged at the start of the downhill path, and if sufficient retard energy is generated along the downhill path to maintain sufficient charge in the OBESS for the mining haul truck to operate, while powered by the OBESS, along the entirety of the downhill path and within the downhill region (region 321 in FIG. 3 or region 451 in FIG. 4).

Embodiments of the invention can be retrofitted into an existing mining haul truck that has a diesel engine and a generator. The diesel engine can be retained for operation under fault conditions or used to charge the OBESS while idling. In other embodiments of the invention, a mining haul truck is not equipped with a diesel engine and generator: the mining haul truck is propelled by electrical power supplied by trolley lines alone, an OBESS alone, or a combination of trolley lines and an OBESS.

Embodiments of the invention have been described with reference to a mining haul truck. One skilled in the art can develop embodiments of the invention for other vehicles driven by electrical motors.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for supplying electrical power to an electrical motor on an all electrically powered mining haul truck, the method comprising initially charging an on-board energy storage system with electrical power from a charging station or a trolley power system while the mining haul truck is coupled to first trolley lines of the trolley power system; uncoupling the mining haul truck from the charging station or the first trolley lines; and supplying electrical power to the electrical motor from the on-board energy storage system while the mining haul truck is uncoupled from the charging station or the first trolley lines and travelling within a first region, coupling the mining haul truck to second trolley lines of a trolley ramp, supplying electrical power to the electrical motor and charging the on-board energy storage system from the second trolley lines while the mining haul truck travels along the trolley ramp, uncoupling the mining haul truck from the second trolley lines, and supplying electrical power to the electrical motor from the on-board energy storage system while the mining haul truck is uncoupled from the second trolley lines and travelling within a second region, wherein the mining haul truck is propelled by electrical power supplied by the trolley power system alone, or by the on-board energy storage system alone, or a combination of the trolley power system and the on-board energy storage system, without mechanical power supplied by a mechanical engine to propel the mining haul truck.

2. The method of claim 1, wherein:
the on-board energy storage system comprises at least one ultracapacitor.

3. The method of claim 1, wherein:
the on-board energy storage system comprises at least one battery.

4. The method of claim 1, wherein:
supplying electrical power to the electrical motor from the trolley power system while the mining haul truck is travelling on an uphill grade when travelling along the trolley ramp.

5. The method of claim 1, further comprising the steps of wherein:
the mining haul truck is travelling on a downhill grade when travelling along the trolley ramp.

6. The method of claim 1, further:
charging the on-board energy storage system with electrical power generated by the electrical motor during braking of the mining haul truck.

7. The method of claim 4, further:
charging the on-board energy storage system with electrical power generated by the electrical motor during braking of the mining haul truck.

8. The method of claim 5, further:
charging the on-board energy storage system with electrical power generated by the electrical motor during braking of the mining haul truck.

9. An electrical power system for supplying electrical power to an electrical motor on an all electrically powered mining haul truck, the electrical power system comprising: an on-board energy storage system; an inverter configured to: receive electrical power from the on-board electrical energy storage system; receive electrical power from a trolley power system; and supply electrical power to the electrical motor; and a controller configured to: Initially charge the on-board energy storage system with electrical power from a charging station or the trolley power system while the mining haul truck is coupled to first trolley lines of the trolley power system; and supply electrical power to the electrical motor from the on-board energy storage system while the mining truck is uncoupled from the charging station or the first trolley lines and traveling within a first region,
supply electrical power to the electrical motor and charge the on-board energy storage system by the second trolley lines of the trolley power system while the mining haul truck travels along a trolley ramp, and supply electrical power to the electrical motor from the on-board energy storage system while the mining haul truck is uncoupled from the second trolley lines and travelling within a second region, wherein the mining haul truck is configured to be propelled by electrical power supplied by at least one of the trolley power system alone, the on-board energy storage system alone, or a combination thereof without mechanical power supplied by a mechanical engine to propel the mining haul truck.

10. The electrical power system of claim 9, wherein:
the on-board energy storage system comprises at least one ultracapacitor.

11. The electrical power system of claim 9, wherein:
the on-board energy storage system comprises at least one battery.

12. The electrical power system of claim 9, wherein:
the on-board energy storage system is configured to be charged with electrical power generated by the electrical motor during braking of the mining haul truck.

13. A method for operating an all electrically powered mining haul truck comprising an electrical motor, the method: charging an on-board energy storage system with electrical power from a trolley power system while the mining haul truck is coupled to first trolley lines of the trolley power system; supplying electrical power to the electrical motor from the trolley power system while the on-board energy storage system is being charged by the trolley power system; uncoupling the mining haul truck from the first trolley lines; supplying electrical power to the electrical motor from the on-board energy storage system; driving the mining haul truck to a loading site; and filling the mining haul truck with a payload; driving the mining haul truck to a trolley ramp;
coupling the mining haul truck to second trolley lines of the trolley power system; driving the mining haul truck along the trolley ramp while coupled to the second trolley lines; supplying electrical power to the electrical motor from the second trolley lines; and charging the on-board energy storage system with electrical power supplied from the second trolley lines, wherein the mining haul truck is propelled by electrical power supplied by the trolley power system alone, or by the on-board energy storage system alone, or a combination of the trolley power system and the on-board energy storage system; without mechanical power supplied by a mechanical engine to propel the mining haul truck.

14. The method of claim 13, further comprising:
charging the on-board energy storage system with electrical power generated by the electrical motor during braking of the mining haul truck.

15. The method of claim 13 further comprising:
driving the mining haul truck to an unloading site; and unloading the payload from the mining haul truck.

16. The method of claim 15, further:
charging the on-board energy storage system with electrical power generated by the electrical motor during braking of the mining haul truck.

17. The method of claim 13, wherein:
the on-board energy storage system comprises at least one ultracapacitor or at least one battery.

* * * * *